(12) United States Patent
Sung

(10) Patent No.: US 10,870,598 B2
(45) Date of Patent: Dec. 22, 2020

(54) METHOD FOR DEEPLY PROCESSING HIGHLY CONTAMINATED WASTEWATER AND WASTEWATER PROCESSING SYSTEM USING

(71) Applicant: Cleanaway Company Limited, Kaohsiung (TW)

(72) Inventor: Lwon-Kuo Sung, Kaohsiung (TW)

(73) Assignee: CLEANAWAY COMPANY LIMITED, Kaohsiung (TW)

( * ) Notice: Subject to any disclaimer, the term of this patent is extended or adjusted under 35 U.S.C. 154(b) by 134 days.

(21) Appl. No.: 16/255,603

(22) Filed: Jan. 23, 2019

(65) Prior Publication Data
US 2019/0367396 A1 Dec. 5, 2019

(30) Foreign Application Priority Data

May 30, 2018 (TW) .............................. 107118557 A

(51) Int. Cl.
| | |
|---|---|
| C02F 1/72 | (2006.01) |
| C02F 1/44 | (2006.01) |
| C02F 1/04 | (2006.01) |
| C02F 1/28 | (2006.01) |
| C02F 9/00 | (2006.01) |
| C02F 101/32 | (2006.01) |

(Continued)

(52) U.S. Cl.
CPC ................ *C02F 9/00* (2013.01); *C02F 1/041* (2013.01); *C02F 1/283* (2013.01); *C02F 1/441* (2013.01); *C02F 1/66* (2013.01); *C02F 1/722* (2013.01); *C02F 2101/16* (2013.01); *C02F 2101/322* (2013.01); *C02F 2103/06* (2013.01); *C02F 2305/026* (2013.01)

(58) Field of Classification Search
CPC .. C02F 1/04; C02F 1/041; C02F 1/441; C02F 1/722; C02F 1/725; C02F 2305/026; C02F 9/00; C02F 2101/30–40; B01D 1/28–2896; E21B 43/34; E21B 43/35
See application file for complete search history.

(56) References Cited

U.S. PATENT DOCUMENTS

| | | | | | |
|---|---|---|---|---|---|
| 5,472,622 | A | * | 12/1995 | Solomon | ................... B01D 1/12 210/767 |
| 5,783,084 | A | * | 7/1998 | Suenkonis | ................ B01D 1/12 159/47.3 |

(Continued)

*Primary Examiner* — Jonathan Luke Pilcher
(74) *Attorney, Agent, or Firm* — Chun-Ming Shih; HDLS IPR Services

(57) ABSTRACT

A method for deeply processing highly contaminated wastewater having salts and volatile organic compounds includes the steps of: performing mechanical vapor recompression on the wastewater to form a first concentrate liquid and a first condensing liquid; performing drying on the first concentrate liquid to form a waste solid and a second condensing liquid; performing reverse osmosis on the first condensing liquid and the second condensing liquid to form a filtrate and a second concentrate liquid; performing Fenton's oxidation on the second concentrate liquid to form an oxidized liquid; and performing mechanical vapor recompression, drying, reverse osmosis, and Fenton's oxidation as above on the oxidized liquid in sequence. Additionally, active carbon adsorption is optionally performed on the filtrate to form a re-filtrate.

8 Claims, 2 Drawing Sheets

(51) Int. Cl.
　　　*C02F 103/06* (2006.01)
　　　*C02F 101/16* (2006.01)
　　　*C02F 1/66* (2006.01)

(56) References Cited

U.S. PATENT DOCUMENTS

| | | | | |
|---|---|---|---|---|
| 6,001,246 A * | 12/1999 | Suenkonis | ............... | B01D 1/12 |
| | | | | 159/24.3 |
| 7,531,096 B2 * | 5/2009 | Yarbrough | ................ | C02F 9/00 |
| | | | | 210/748.15 |
| 8,343,328 B2 * | 1/2013 | Hook | ....................... | C01D 3/14 |
| | | | | 205/536 |
| 9,738,553 B2 * | 8/2017 | Chidambaran | .......... | B01D 9/00 |
| 10,538,445 B2 * | 1/2020 | Chidambaran | .......... | B01D 1/00 |
| 10,696,574 B2 * | 6/2020 | Zhang | .................. | B01J 37/0213 |
| 2007/0125719 A1 * | 6/2007 | Yarbrough | ................ | C02F 9/00 |
| | | | | 210/748.15 |
| 2013/0240442 A1 * | 9/2013 | Chidambaran | ........... | C02F 9/00 |
| | | | | 210/638 |
| 2017/0334758 A1 * | 11/2017 | Chidambaran | .......... | B01D 1/00 |

* cited by examiner

METHOD FOR DEEPLY PROCESSING HIGHLY CONTAMINATED WASTEWATER AND WASTEWATER PROCESSING SYSTEM USING

CROSS REFERENCE

This non-provisional application claims priority of Taiwan Invention Patent Application No. 107118557, filed on May 30, 2018, the contents thereof are incorporated by reference herein.

FIELD OF THE INVENTION

The present invention is directed to a method for processing wastewater and a wastewater processing system using the same method, and more particularly to a method for deeply processing highly contaminated wastewater and a wastewater processing system using the same method.

BACKGROUND OF THE INVENTION

Since wastewater contains volatile organic compounds (VOCs), which can be readily dissipated to the environment in the form of gas. When people inhale wastewater, it poses appreciable risks to health, e.g. elicitation of respiratory disease or cardiovascular disease. Therefore, the method for processing wastewater thereof should be taken into consideration.

In this field of wastewater processing, many prior art have been provided, such as Taiwan Invention Patent Application No. 100125183, it reveals a filtering medium for reducing the contaminant content in fluids, and the medium comprises iron and copper in the form chosen from at least one of: a mixture containing a major part of an iron-based powder and a minor part of a copper-based powder, an iron-copper powder alloy, and an iron-based porous and permeable composite containing copper. Another American Invention patent application Ser. No. 13/388,493 discloses a porous and permeable composite for treatment of contaminated fluids, and the composite comprises a body of iron particles having a particle size range between 10 μm and 10 mm and at least one functional ingredient selected from the group consisting of carbon containing compounds, calcium containing compounds, sodium containing compounds, iron containing compounds, titanium containing compounds, and aluminum containing compounds, distributed and locked in pores and cavities of the iron body in free form. However, these prior compositions only can adsorb some specific types of volatile organic compounds and the nonadsorbed types of volatile organic compounds are still dissipated to the environment to cause damage.

Moreover, Taiwan Invention Patent Application No. 102126680 discloses a method for eliminating benzene or naphthalene in a contaminated medium, and the method comprises adding *Acinetobacter junii* DS44 strains or their sub-cultured offspring to a contaminated medium to degrade benzene or naphthalene in the contaminated medium. Taiwan Invention Patent Application No. 103141045 provides a method of wastewater treatment and it is characterized in that *Pseudomonas denitrificans* PD1 strains, phenol, and inorganic sulfide are contained in one liter of wastewater having a pH value of from 5.5 to 10 at the weight ratio of from 1:0.2:0.2 to 1:100:50, and the phenol in the wastewater is degraded in the presence of inorganic sulfide with a thiosulfate group or the salt thereof. Nevertheless, the prior methods belong to biodegradation, and only can degrade some specific types of volatile organic compounds. Apparently, the nondegraded types of volatile organic compounds are still dissipated to the environment and cause damage.

As described above, a novel and progressive method for processing highly contaminated wastewater to avoid volatile organic compounds dissipated into the environment is needed to be achieved.

SUMMARY OF THE INVENTION

An objective of the present invention is to provide a method for processing wastewater, where the volatile organic compounds in the wastewater can be destroyed and become nonvolatile and then exist in the solid form. As such, there is barely no volatile organic compounds being dissipated into the environment.

Therefore, a method for deeply processing highly contaminated wastewater having salts and volatile organic compounds is provided. The method includes the steps of: performing mechanical vapor recompression (MVR) on the wastewater to form a first concentrate liquid and a first condensing liquid; performing drying on the first concentrate liquid to form a waste solid and a second condensing liquid; performing reverse osmosis on the first condensing liquid and the second condensing liquid to form a filtrate and a second concentrate liquid; performing Fenton's oxidation on the second concentrate liquid to form an oxidized liquid; and performing mechanical vapor recompression, drying, reverse osmosis, and Fenton's oxidation as above on the oxidized liquid in sequence.

Within the scope of the present invention, a wastewater processing system is provided. The system includes: a mechanical vapor recompression member, a drying member, a reverse osmosis member, and a Fenton's oxidation member. The mechanical vapor recompression member is configured for performing mechanical vapor recompression on wastewater having salts and volatile organic compounds to form a first concentrate liquid and a first condensing liquid; the drying member is connected to the mechanical vapor recompression member for receiving the first concentrate liquid and performing drying on the first concentrate liquid to form a waste solid and a second condensing liquid; the reverse osmosis member is connected to the mechanical vapor recompression member and the drying member for receiving the first condensing liquid and the second condensing liquid and performing reverse osmosis on the two condensing liquids to form a filtrate and a second concentrate liquid; the Fenton's oxidation member is connected to the reverse osmosis member for receiving the second concentrate liquid and performing Fenton's oxidation on the second concentrate liquid to form an oxidized liquid, and the Fenton's oxidation member is also connected to the mechanical vapor recompression member for receiving the oxidized liquid and then performing mechanical vapor recompression, drying, reverse osmosis, and Fenton's oxidation as above on the oxidized liquid in sequence.

According to the present invention, since the first concentrate liquid is separated into the waste solid and the second condensing liquid in the drying, and some volatile organic compounds are contained in the second condensing liquid (the others in the first condensing liquid), the waste solid contains salts and is substantially free from the volatile organic compounds. As such, after the waste solid is buried, the problem of the volatile organic compounds dissipated into the environment can be resolved. In another aspect, since the filtrate contains a trace amount of chemical oxygen demand (COD), ammonia, and total dissolved solids (TDS), it can be directly applied in non-human contact daily applications, e.g. toilet cleaning, plant irrigation, car washing, or dust controlling. In the other aspect, since the second concentrate liquid contains a large number of the volatile organic compounds, the Fenton's oxidation can convert the volatile organic compounds into nonvolatile organic compounds so that the oxidized liquid contains the nonvolatile organic compounds. In such a way, after the oxidized liquid is treated via mechanical vapor recompression, drying, reverse osmosis, and Fenton's oxidation in sequence, the nonvolatile organic compounds can be contained in another waste solid. Likewise, the problem of the volatile organic compounds dissipated into the environment can be resolved.

DETAILED DESCRIPTION OF THE INVENTION

The detailed description and preferred embodiments of the invention will be set forth in the following content, and provided for people skilled in the art so as to understand the characteristics of the invention.

Figure 1:
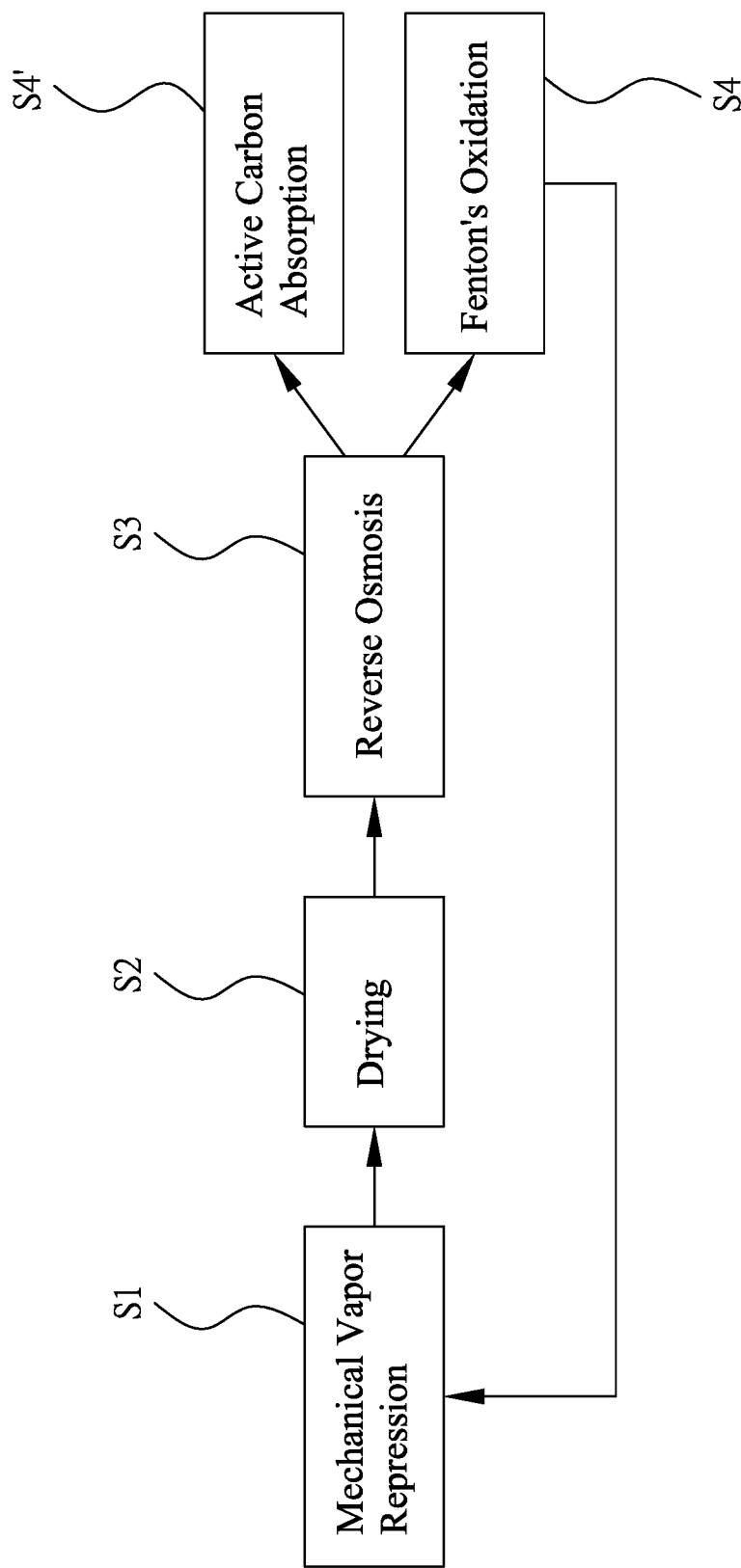
FIG. 1 is a flow diagram illustrating a method for deeply processing highly contaminated wastewater in an embodiment of the present invention.

With reference to FIG. 1, a method for deeply processing highly contaminated wastewater in an embodiment of the present invention is depicted, and the wastewater contains salts and volatile organic compounds. Generally, this exemplary method is applicable for highly contaminated wastewater having highly volatile organic compounds and salts or highly contaminated wastewater having lowly volatile organic compounds and salts. Especially, it is difficult to treat highly volatile organic compounds, and therefore the exemplary method is indeed kind for the environment. The method for each step in the exemplary is made as below.

Firstly, a mechanical vapor recompression step (S1) is conducted. During the step (S1), mechanical vapor recompression is performed on the wastewater to obtain a first concentrate liquid and a first condensing liquid. "Mechanical vapor recompression" is an evaporation technique where vapor with low potential temperature is compressed and latent heat in the vapor is leveraged with temperature, pressure, and enthalpy elevation. This technique has advantage of saving energy and space occupied by the related device, has greater economic benefit than the multi-effect distillation technique, and is currently applicable in a concentration process for chemical, food, paper, and pharmaceutical production and a recycling process for pure water. In this embodiment, the mechanical vapor recompression provides the wastewater with high temperature and high pressure, and a little of chemical oxygen demand and a lot of total dissolved solids (most are salts) in the wastewater are nonvolatile in low temperature. Accordingly, these nonvolatile substances are contained in the first concentrate liquid after performing the mechanical vapor recompression. Further, ammonium nitrogen ($NH_3$—N) in the wastewater is not stable and is easily converted into ammonia to vaporize to the environment. In order to settle this problem, prior to the mechanical vapor recompression performing, an acid is optionally added to the wastewater to lower the pH value so as to stabilize the ammonium nitrogen. For example, a sulfuric acid is added to the wastewater to react with the ammonium nitrogen and thus ammonium sulfate (($NH_4$)$_2$SO$_4$) is formed in the first concentrate liquid. Additionally, after the mechanical vapor recompression, most volatile organic compounds evaporate to the first condensing liquid. In this embodiment, the conditions for mechanical vapor recompression can be chosen according to the wastewater type or ingredients by people having ordinary skill in the art. Preferably, the heating temperature thereof is from 70 to 80° C., and the evaporation pressure thereof is from $-0.45$ to $-0.55$ kg/cm$^2$.

Secondly, a drying step (S2) is implemented. During the step (S2), drying is performed on the first concentrate liquid to obtain a waste solid and a second condensing liquid. Since the first concentrate liquid contains a trace amount of the volatile organic compounds, these volatile organic compounds exist in the second condensing liquid after drying. That is, the waste solid contains salts and is substantially free from the volatile organic compounds; its ingredients may be, but not limited to, sodium chloride, calcium chloride, calcium sulfate, and ammonium sulfate. As such, the problem the volatile organic compounds are dissipated to the environment is overcome via burying the waste solid. In the present embodiment, the drying may be, but not limited to, heating, and the conditions for heating can be chosen according to actual demands by people having ordinary skill in the art. Preferably, the temperature thereof is from 120 to 130° C.

Next, a reverse osmosis step (S3) is carried out. During this step (S3), reverse osmosis is performed on the first condensing liquid and the second condensing liquid to obtain a filtrate and a second concentrate liquid. "Reverse osmosis" is a separation technique where the solute (e.g. an impurity) and the solvent (e.g. water) in a liquid are separated by means of the pressure as a driving force and the selective retaining property of a membrane. In this embodiment, the reverse osmosis separates the first condensing liquid and the second condensing liquid to the filtrate and the second concentrate liquid. The filtrate is equivalent to a solvent, contains water and is substantially free from any volatile organic compounds; the second condensing liquid is equivalent to a solute and contains the volatile organic compounds. In addition, the filtrate contains a trace amount of chemical oxygen demand (COD), ammonia, and total dissolved solids (TDS), and can be directly applied in non-human contact daily applications, e.g. toilet cleaning, plant irrigation, car washing, or dust controlling.

Finally, a Fenton's oxidation step (S4) is completed. During this step (S4), Fenton's oxidation is performed on the second concentrate liquid to obtain an oxidized liquid. "Fenton's oxidation" is a technique where an iron (II) ion ($Fe^{2+}$) is used as the catalyst of hydrogen peroxide to form a hydroxyl radical (.OH) having high oxidative capacity via reaction so as to perform oxidative bond-breaking on organic compounds. In the embodiment, the Fenton's oxidation may be, but not limited to, Fered-Fenton's (Fenton III) oxidation, an advantage thereof is that an iron (III) ion ($Fe^{3+}$) originating from an iron (II) ion can revert back to the iron (II) ion to reuse the iron (II) ion and lower the production of iron (III) hydroxide ($Fe(OH)_3$). In this embodiment, since the second concentrate liquid contains volatile organic compounds, a free radical having high oxidative capacity generated in the Fenton's oxidation can break the bonds of the volatile organic compounds so as to convert these volatile organic compounds into nonvolatile organic compounds. As such, the oxidized liquid contains the nonvolatile organic compounds formed from the volatile organic compounds through the Fenton's oxidation, and mechanical vapor recompression, drying, reverse osmosis, and Fenton's oxidation as above are further performed on the oxidized liquid in sequence. Moreover, since the oxidized liquid contains the iron (III) hydroxide formed by the Fenton's oxidation, the iron (III) hydroxide can exist in another waste solid to be buried after performing the mechanical vapor recompression, the drying, the reverse osmosis, and the Fenton's oxidation on the oxidized liquid.

Optionally, after the reverse osmosis step (S3), an active carbon adsorption step (S4') is implemented, where active carbon adsorption is performed on the filtrate to obtain a re-filtrate. "Active carbon adsorption" is a technique where an active carbon material is used to adsorb hard-degradable substances or hard-dissolvable substances in water so as to improve the water quality. In the present embodiment, although the filtrate contains a trace amount of chemical oxygen demand, ammonia, and total dissolved solids, it can't be directly used for human contact daily applications. Because the re-filtrate has less chemical oxygen demand, ammonia, and total dissolved solids than the filtrate, the re-filtrate can be directly applied in human contact daily applications, e.g. bathing or dish washing. In this present embodiment, the active carbon material used is, but not limited to, an active carbon granule.

Figure 2:
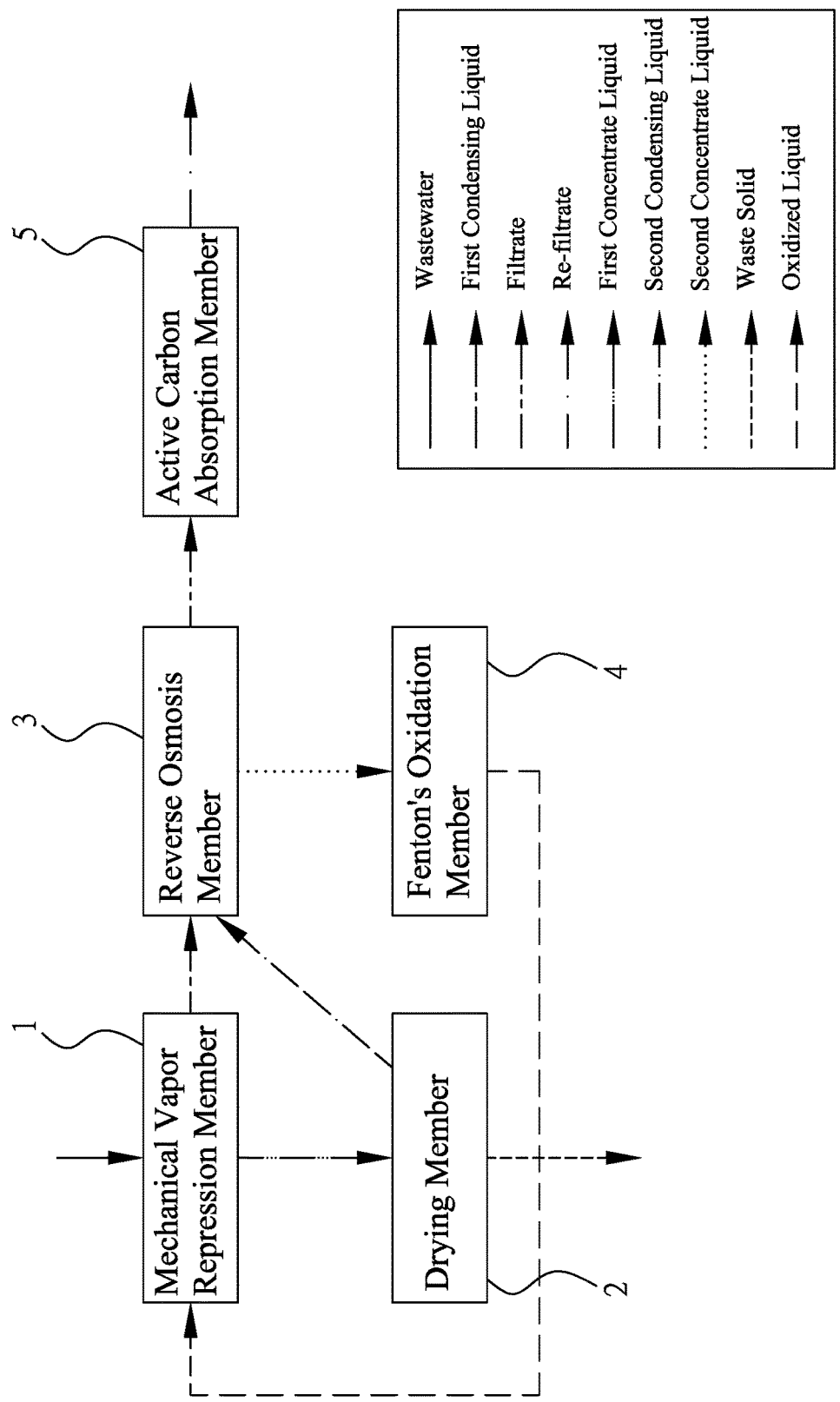
FIG. 2 is a block diagram illustrating a system using the foregoing method.

As shown in FIG. 2, a system using the foregoing method is depicted, and the system includes: a mechanical vapor recompression member (1), a drying member (2), a reverse osmosis member (3), a Fenton's oxidation member (4), and an active carbon adsorption member (5).

The mechanical vapor recompression member (1) can carry out the abovementioned mechanical vapor recompression step.

The drying member (2) is connected to the mechanical vapor recompression member (1) and can receive the first concentrate liquid obtained in the mechanical vapor recompression step to carry out the abovementioned drying step.

The reverse osmosis member (3) is connected to the mechanical vapor recompression member (1) and the drying member (2), can receive the first condensing liquid obtained in the mechanical vapor recompression step and the second condensing liquid obtained in the drying step to perform the abovementioned reverse osmosis step.

The Fenton's oxidation member (4) is connected to the reverse osmosis member (3) and the mechanical vapor recompression member (1). By the connection to the reverse osmosis member (3), the Fenton's oxidation member (4) can receive the second concentrate liquid obtained in the reverse osmosis step to perform the abovementioned Fenton's oxidation step; by the connection to the mechanical vapor recompression member (1), the Fenton's oxidation member (4) can receive the oxidized liquid obtained in the Fenton's oxidation step to perform mechanical vapor recompression, drying, reverse osmosis, and Fenton's oxidation on the oxidized liquid in sequence. It is noted that since iron (III) hydroxide is formed in Fenton's oxidation, any prior Fenton's oxidation device is deposited with a sedimentation pool and a dehydrator for processing the iron (III) hydroxide. In the present embodiment, since the oxidized liquid contains iron (III) hydroxide, the iron (III) hydroxide exists in another waste solid after the mechanical vapor recompression, drying, reverse osmosis, and Fenton's oxidation performing on the oxidized liquid. At least for these reasons, the Fenton's oxidation member (4) is not deposited with any sedimentation pool and any dehydrator.

The active carbon adsorption member (5) is connected to the reverse osmosis member (3) and can receive the filtrate obtained in the reverse osmosis step to perform the abovementioned active carbon adsorption step.

In order to confirm the advantages of the present embodiment, wastewater A and wastewater B are chosen to be processed according to the foregoing method. Meanwhile, each product obtained in each step is collected for component analysis. The analysis results are listed in Table 1.

TABLE 1

Components of each product in each step

| | pH | Total dissolved solids (mg/L) | Chemical oxygen demand (mg/L) | Ammonia (mg/L) |
|---|---|---|---|---|
| Wastewater A | 8.5 | 30,000 | 7,000 | 1,000 |
| Wastewater B | 10.5 | 200,000 | 2,000 | 800 |
| First condensing liquid | — | <50 | <500 | <50 |
| Filtrate | — | <50 | <180 | <20 |
| Second concentrate liquid | — | <500 | <3,000 | <300 |
| Oxidized liquid | — | <5,000 | <300 | <300 |
| Re-filtrate | — | <50 | <80 | <10 |

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for deeply processing highly contaminated wastewater having salts and volatile organic compounds, comprising:
   a) performing mechanical vapor recompression (MVR) on the wastewater to form a first concentrate liquid and a first condensing liquid;
   b) performing drying on the first concentrate liquid to form a waste solid and a second condensing liquid;
   c) performing reverse osmosis on the first condensing liquid and the second condensing liquid to form a filtrate and a second concentrate liquid;
   d) performing Fenton's oxidation on the second concentrate liquid to form an oxidized liquid; and
   e) further processing the oxidized liquid by performing steps a), b), c), and d) on the oxidized liquid in sequence.

2. The method as claimed in claim 1, further comprising: after the reverse osmosis step, performing active carbon adsorption on the filtrate to form a re-filtrate.

3. The method as claimed in claim 1, further comprising: before the mechanical vapor recompression step, adding an acid to the wastewater.

4. The method as claimed in claim 3, wherein the acid is a sulfuric acid.

5. The method as claimed in claim 1, wherein the Fenton's oxidation is Fered-Fenton's (Fenton III) oxidation.

6. The method as claimed in claim 1, wherein the mechanical vapor recompression has a heating temperature from 70 to 80° C. and an evaporation pressure from −0.45 to −0.55 kg/cm2.

7. The method as claimed in claim 1, wherein the drying has a heating temperature from 120 to 130° C.

8. The method as claimed in claim 1, wherein the wastewater is leachate or industrial wastewater.

* * * * *